(12) United States Patent
Salter et al.

(10) Patent No.: US 12,204,021 B2
(45) Date of Patent: Jan. 21, 2025

(54) SYSTEMS AND METHODS FOR A GROUND-PENETRATING TAILGATE SENSOR SYSTEM

(71) Applicant: Ford Global Technologies, LLC, Dearborn, MI (US)

(72) Inventors: Stuart Salter, White Lake, MI (US); Terry Lobsinger, Farmington Hills, MI (US); Paul Kenneth Dellock, Northville, MI (US); Ryan Edwin Hanson, Livonia, MI (US); John Van Wiemeersch, Novi, MI (US); Vivekanandh Elangovan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 400 days.

(21) Appl. No.: 17/583,593

(22) Filed: Jan. 25, 2022

(65) Prior Publication Data

US 2023/0236312 A1 Jul. 27, 2023

(51) Int. Cl.
*G01S 13/931* (2020.01)
*B60R 13/04* (2006.01)
*G01S 13/06* (2006.01)

(52) U.S. Cl.
CPC ............ *G01S 13/931* (2013.01); *B60R 13/04* (2013.01); *G01S 13/06* (2013.01); *G01S 2013/93272* (2020.01)

(58) Field of Classification Search
None
See application file for complete search history.

(56) References Cited

U.S. PATENT DOCUMENTS

| 5,835,054 | A | 11/1998 | Warhus et al. |
| 8,207,885 | B2 | 6/2012 | Hibbard et al. |
| 8,629,799 | B2 | 1/2014 | Shope |
| 9,440,579 | B2 * | 9/2016 | Salter ................... B60Q 1/2661 |
| 9,980,437 | B2 * | 5/2018 | Smith .................. A01F 15/0883 |
| 10,371,814 | B2 | 8/2019 | Chan et al. |
| 11,029,402 | B2 | 6/2021 | Huston et al. |

(Continued)

FOREIGN PATENT DOCUMENTS

| CN | 104597442 A | 5/2015 | |
| CN | 111722217 A | 9/2020 | |
| JP | H1090433 A * | 4/1998 | ............... G01V 3/12 |

OTHER PUBLICATIONS

Ji-Young Rhee et al., A Study of the Application and the Limitations of GPR Investigation on Underground Survey of the Korean Expressways, Remote Sensing, 2021, 13, 1805.

(Continued)

*Primary Examiner* — Vladimir Magloire
*Assistant Examiner* — Eric K Hodac
(74) *Attorney, Agent, or Firm* — Frank Lollo; Eversheds Sutherland (US) LLP

(57) ABSTRACT

This disclosure describes systems and methods for a ground-penetrating tailgate sensor system. An example method may also include transmitting, using a radar transceiver, a first radar signal towards a location above the tailgate. The example method may also include receiving, based on the tailgate being in a closed or open position and using the radar transceiver, a first return signal from an object located above the vehicle.

20 Claims, 10 Drawing Sheets

(56) References Cited

U.S. PATENT DOCUMENTS

| | | | |
|---|---|---|---|
| 11,591,841 B2* | 2/2023 | Uebel | E05F 15/73 |
| 2020/0291676 A1* | 9/2020 | Shah | G07C 9/00563 |

OTHER PUBLICATIONS

Rolf Ole Rydeng Jenssen et al., Drone-Mounted Ultrawideband Radar for Retrieval of Snowpack Properties, IEEE Transactions on Instrumentation and Measurement, Feb. 13, 2019.

Matthew Cornick et al., Localizing Ground Penetrating Radar; A Step Toward Robust Autonomous Ground Vehicle Localization, MIT Lincoln Laboratory, Journal of Field Robotics 33(1), 82-102, Apr. 27, 2015.

* cited by examiner

SYSTEMS AND METHODS FOR A GROUND-PENETRATING TAILGATE SENSOR SYSTEM

BACKGROUND

Ground-penetrating radar (GPR) systems may be employed to obtain precise location data for underground utility and sewer systems (as well as any other types of objects). These systems are capable of locating utility lines within an error threshold of inches, which provides far more precise location determinations than other types of systems. These ground-penetrating systems may be used in various applications, such as on brown and greenfield sites before construction occurs, as well as after the construction takes place to confirm everything was placed in the correct locations. Ground-penetrating systems may also be used to inspect highways and bridges for unseen wear. Law enforcement agencies may use ground-penetrating systems to search for buried forensic evidence around crime scenes. These types of systems may also be used in association with any other use cases as well.

With current ground-penetrating systems, the site often needs to be surveyed first with mapped grids. A human operator may then pass back and forth over the gridded surveyed area with a portable cart or trailer-mounted unit holding the ground-penetrating system. The ground-penetrating system emits a continuous series of high-frequency radio waves, which pass through the ground. The strength and rate at which this electromagnetic energy is reflected back from various materials may then be measured. Different substances have various capacities to absorb or reflect electrical energy. The data may then be displayed as a radargram that can be interpreted by operators.

Current ground-penetrating sensor systems exist in various forms. One example is a system that is similar in size and shape to a lawnmower that is manually pushed or pulled by a human operator. This can be very costly in terms of labor and equipment, especially if the human operator is required to cover a large area with this type of system. A second example includes a ground-penetrating sensor system that is attached to a vehicle and pulled along with the vehicle. Each of these units may be labor-intensive as such manual data capture may consume an extensive time period. Additionally, trailer tow systems require setup and storage of the unit and are more difficult to maneuver, particularly when the vehicle is required to reverse.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems and methods for a ground-penetrating tailgate sensor system. In one or more embodiments, the ground-penetrating tailgate sensor system may involve one or more different types of sensors being disposed of within a vehicle tailgate. Such sensors may include radar, ultra-wideband (UWB) sensors, and/or any other types of suitable sensors. The system may also be configured such that the sensors may be used for ground-penetrating data collection purposes when the tailgate is in one position (e.g., open or closed), and the sensors may be used for other vehicles systems (for example, blind-spot detection, backup parking assistance, rear crash avoidance, lane change assistance, etc.) when the tailgate is in a second position (e.g., open or closed). A power tailgate feature of the vehicle may be used to automatically switch between these two modes. For example, a user may be able to switch the tailgate between the closed position and the open position through the human-machine interface (HMI) of the vehicle, a mobile phone application, key fob, and/or through any other suitable system or method.

In one or more embodiments, the position of the tailgate in which the vehicle performs the data collection may depend on the vehicle configuration and/or the types of data that is desired to be collected. For example when it is desired to capture underground data, data collection may be performed by the sensors when the tailgate is in an open position and the sensors may be used for the other vehicle systems mentioned above when the tailgate is in a closed position. However, the opposite may also be possible as well. That is, the vehicle may collect data when in the closed position and may be used for the other vehicle systems mentioned above when the tailgate is in an open position (for example, when it is desired to capture data relating to objects located above the vehicle).

In one or more embodiments, the sensors may be mounted near the top of the tailgate so the sensors are rearward of the bumper when the tailgate is deployed so the sensors may have an unobstructed view of the ground, and the bumper does not block the signals associated with the sensors.

Figure 2:
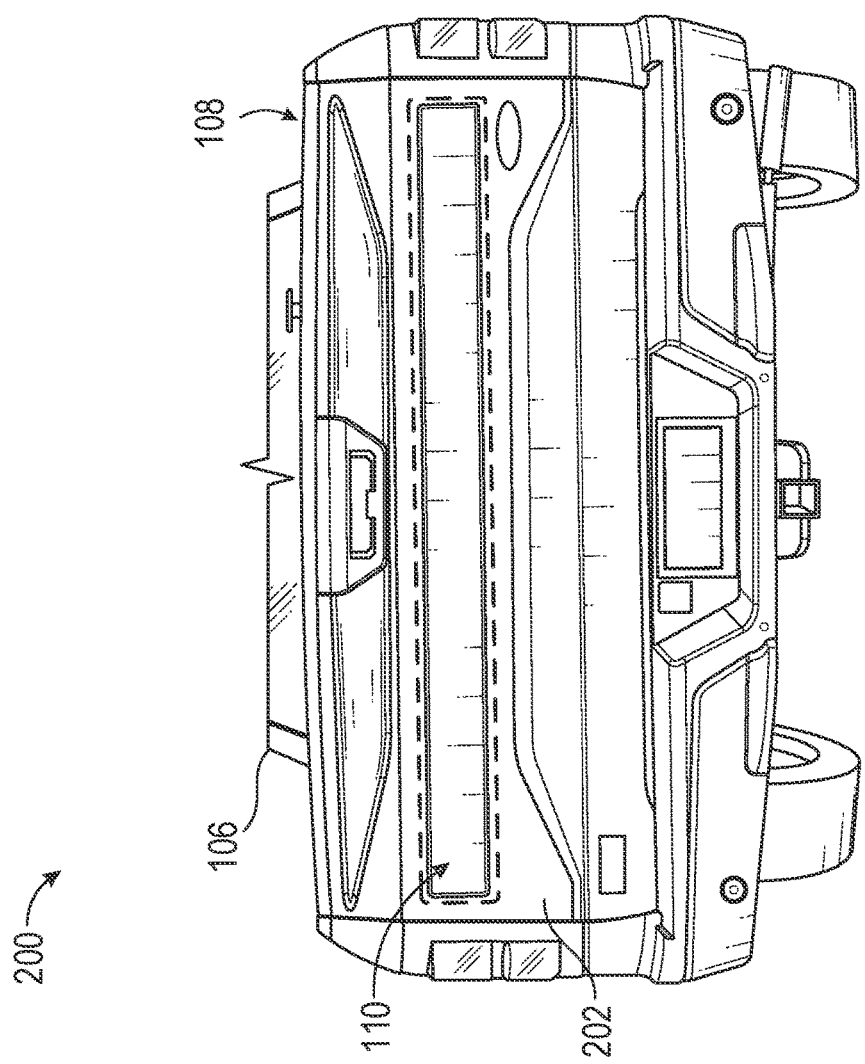
FIG. 2 illustrates an example ground-penetrating tailgate configuration, in accordance with one or more embodiments of the disclosure.

In one or more embodiments, the sensors may more specifically be mounted in the trim applique of the vehicle tailgate (further illustrated in at least FIG. 2). The trim applique itself may be molded in color, painted, or have a chrome-like appearance. For trim appliques with a chrome-like appearance, a decorative film vacuum metalized with indium may be the preferred coating because it may provide the appearance of chrome, while simultaneously not interfering with sensor signals. Certain types of metallic paint may not be compatible with certain types of sensors. Given this, a compatible paint may need to be selected if the trim applique is painted. In one or more embodiments, a removable panel in the tailgate that may have add-on wheels and a portable power supply may also be provided to allow the system to navigate into tight quarters or areas where vehicle weight or dimensions are a concern.

Figure 3:
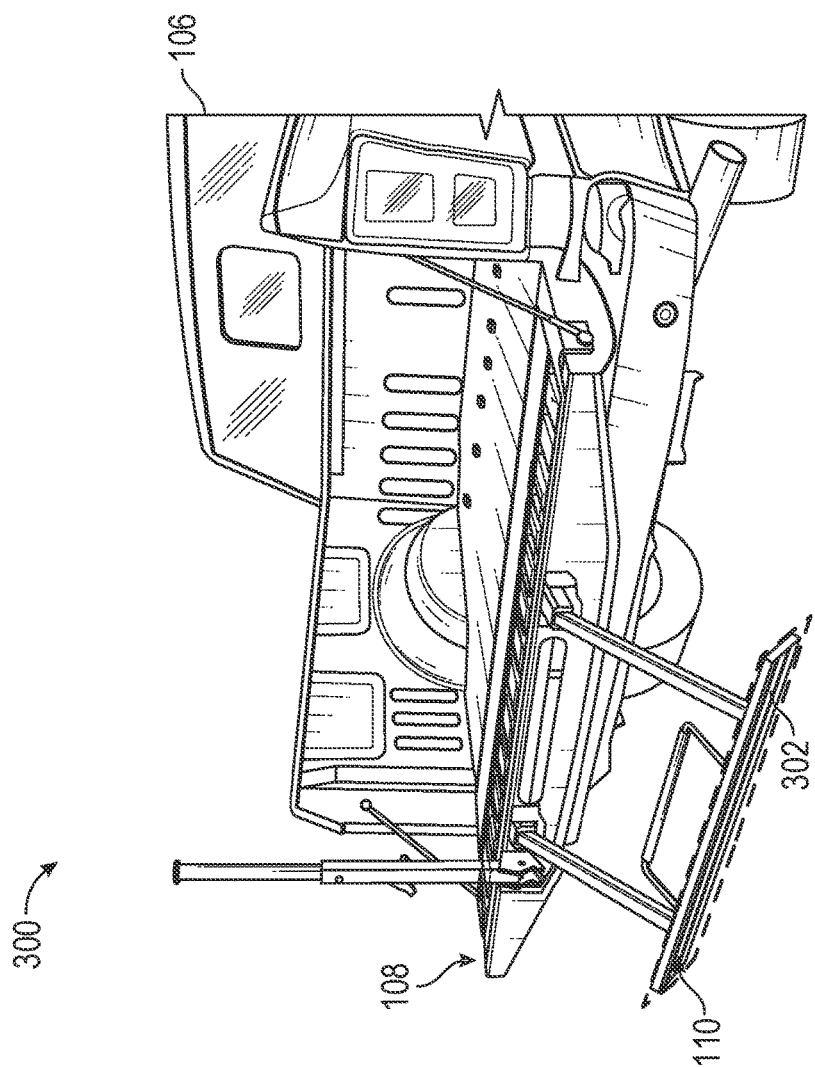
FIG. 3 illustrates an example ground-penetrating tailgate configuration, in accordance with one or more embodiments of the disclosure.

In one or more embodiments, the sensors may also be mounted on an extendable tailgate step (for example, a step that extends from the vehicle tailgate as illustrated in FIG. 3). Similar to embodiments in which the sensors are disposed within the tailgate itself, this embodiment may be configured such that the sensors may be used for ground-penetrating data collection purposes when the extendable step is extended from the tailgate, and the sensors may be used for other vehicles systems when the extendable step is stowed within the tailgate. This configuration extends the sensors further from the bumper, so the sensors may have an unobstructed view of the ground, and the bumper does not block the signals. Additionally, this configuration has the advantage of moving the sensors closer to the ground to potentially provide deeper or more detailed mapping. Similar to other embodiments, the system can automatically switch between modes or as an option when the step is deployed, and the vehicle is powered and or motive.

In one or more embodiments, the sensors may also be disposed of within or on any other portion of the tailgate or any other portion of the vehicle in general (even portions of the vehicle outside of the tailgate).

Figure 4:
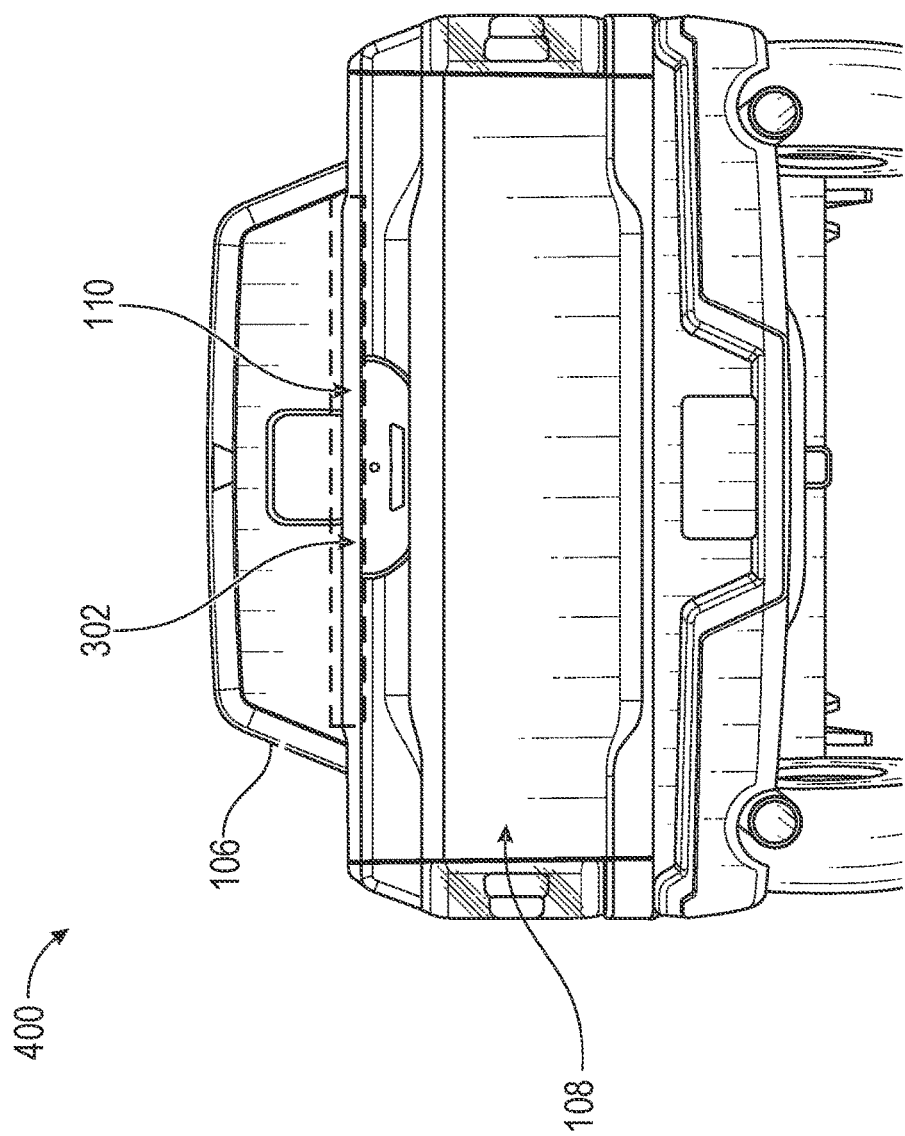
FIG. 4 illustrates an example ground-penetrating tailgate configuration, in accordance with one or more embodiments of the disclosure.
Figure 5:
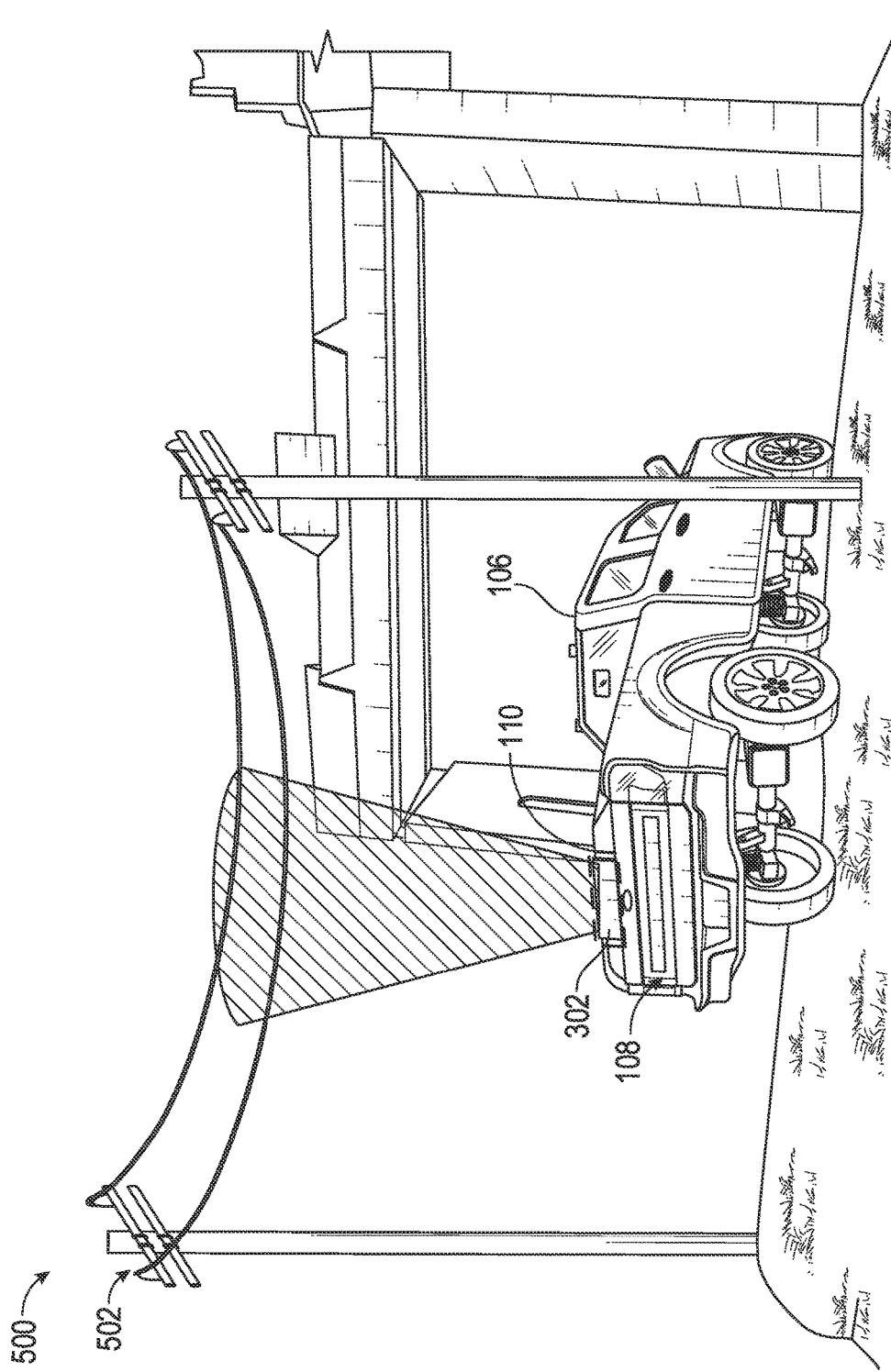
FIG. 5 illustrates an example ground-penetrating tailgate configuration, in accordance with one or more embodiments of the disclosure.

In one or more embodiments, the sensors may also be configured to obtain data while facing an upwards direction (for example, as shown in FIG. 5) rather than facing towards the ground. When the sensors are facing upward, the system may also be used as an overhead distance detector. This may provide an indication of objects that may provide low clearance for equipment or oversized loads, for example. This overhead data collection may be accomplished through a number of different tailgate sensor configurations. For example, in embodiments in which the sensors are disposed of in an extendable step, the sensors in the extendable step may face in an upwards direction when the tailgate is closed (illustrated in FIGS. 4-5). However, the overhead data collection may also be obtained in other configurations, such as embodiments in which the sensors are disposed of in the tailgate behind the trim applique. In such embodiments, additional sensors may be disposed of in the applique that face in the upwards direction when the tailgate is open. Alternatively, the sensors and/or the tailgate may be physically rotatable so that the sensors may either point in the downward direction or in the upward direction.

In one or more embodiments, the sensors may also be configured to obtain data from objects that are neither above nor below the vehicle. For example, the sensors may be configured to obtain data when the tailgate is in a closed position from objects that are located behind or beside the tailgate. This may also be applicable when the tailgate is in the open position as well.

In one or more embodiments, if the sensors that are used in the ground-penetrating sensor system are radar transceivers, multiple frequencies may be used for purposes of obtaining data. For example, a multi-frequency radar system rated at 15 W (or any other power level) may be used that sends radar signals at three distinct frequencies. The first frequency may be 250 MHz (or a similar frequency or range of frequencies). This frequency may be used for data collection from larger items that are located deeper underground, such as sewer lines. The 250 MHz radar may typically penetrate, depending on soil conditions, 15-30 feet deep, but may not be as accurate as higher frequency radar pulses. The second frequency may be 500 MHz (or a similar frequency or range of frequencies). This frequency may be more sensitive and may accurately map smaller objects, such as utility lines and larger electrical lines. The 500 MHz Radar may typically penetrate 8-15 feet, which may be ideal for utility lines and is more accurate than 250 MHz signals. The third frequency may be 1 GHz (or a similar frequency or range of frequencies). This frequency may be far more sensitive and may accurately map small items, such as conduits and dog fences. The 1 GHz radar may typically penetrate only 4-8 feet, so the lower frequencies may be required to capture data relating to items located deeper in the ground. Although this provides one example of a number of frequencies and/or specific frequency values, this is not intended to be limiting and any other number of frequencies and/or frequency values may also be used.

In one or more embodiments, if the sensors that are used in the ground-penetrating sensor system are ultra-wideband (UWB) sensors, different frequencies may be used for purposes of obtaining data (however, the same frequencies may also be used as well). For example, a two-frequency radar system rated at 15 W (or any other power level) may be used that sends radar signals at three distinct frequencies. The first frequency may be 1 GHz (or a similar frequency or range of frequencies). This frequency may be far more sensitive and may accurately map small items, such as footings, conduits, buried utility and dog fences, etc. The 1 GHz UWB may typically penetrate only 4-8 feet. The second frequency may be 3 GHz (or a similar frequency or range of frequencies). This frequency may be far more sensitive and capable of detecting pockets of water, coatings, corrosion, density and/or swelling of small items such as rebar. The 3 GHz UWB may typically penetrate only 4-8 feet, so radars may be used to gather data relating to deeper items. In walls, 1 GHz signals may be used to detect thinner objects like studs, wiring, plumbing, and nails within a wall. 3 GHz signals may be used to detect rebar coatings, voids and density differences like corrosion. Although this provides one example of a number of frequencies and/or specific frequency values, this is not intended to be limiting and any other number of frequencies and/or frequency values may also be used.

In one or more embodiments, a specific type of trim applique may be used to ensure that any sensor signals are not inhibited by the material comprising the trim applique. Most metals or metallic-coated plastic parts may block radar signals. To mitigate this potential limitation, chrome may be sputtered as a thin film with indium to get a chrome appearance. Any radar signals may pass between the indium molecules. In one or more embodiments, this chrome trim applique may include an outer layer of indium film which may provide the basic "chrome" appearance which is made by sputtering the thin layer of indium to the backside of a plastic film. The trim applique may also include a second layer of backing film that is laminated to the back of the indium film that is used to seal the indium layer The trim applique may also include an adhesive layer that is used to bond the film to the applique. The trim applique may also include a rear applique substrate. The applique may be made by inserting the film into a specially designed injection mold and injection molding the plastic substrate behind the injection mold. Additional details about the trim applique may be provided in U.S. application Ser. No. 16/519,126 titled "ILLUMINATABLE VEHICLE ASSEMBLY AND VEHICLE ASSEMBLY ILLUMINATION METHOD" filed on Jul. 23, 2019, which is hereby incorporated by reference.

In one or more embodiments, the ground-penetrating tailgate sensor system described herein may be used for any number of different purposes. As a first example, the ground-penetrating tailgate sensor system may be used to measure the thickness of certain materials, such as asphalt or cement. As an example use case, this may be used as an audit tool (for example, auditing roadway construction). As a second example, for ice roads or sports events taking place on frozen lakes, ice thickness may be measured to determine the viability of the lake for performing the relevant activities. As a third example, the ground-penetrating tailgate sensor system may map out, or directly communicate, the location of underground (and/or above-ground) obstructions. The locations of such obstructions may be indicated, for example, using GPS to geofence regions to indicate locations of concern and provide them to following vehicles or the site as zones where system-linked equipment may not operate or only operate below a certain vertical extension eliminating operator errors. These are merely examples of use cases for which the ground-penetrating tailgate sensor system may be applicable and are not intended to be limiting in any way.

In one or more embodiments, the data collection may be performed automatically based on certain triggering conditions. A first example of such a triggering condition may include the vehicle entering a geo-fence location. For example, a user may indicate specific GPS locations (or geofenced regions) or types of locations in which it is desired to capture data. In such scenarios, the vehicle may automatically begin capturing data when the vehicle determines that it has entered the indicated GPS location or type of location (or geofenced region). Examples of types of locations may include construction zones, specific types of roads, parking lots, and/or any other type of location.

In one or more embodiments, the data collection may also be performed based on manual triggering conditions. For example, a user may be able to initiate data collection through a human-machine interface (HMI) of the vehicle, a mobile phone application, key fob, and/or through any other suitable system or method.

In one or more embodiments, automatic configuration adjustments may be performed to the vehicle based on the triggering condition being met. For example, the tailgate of the vehicle may automatically be changed to an open position to allow for underground data capture. In configurations involving an extendable step (for example, as illustrated in at least FIG. 3), the extendable step may also be extended from the tailgate.

In one or more embodiments, the ground-penetrating sensor system described herein provides a number of benefits. For example, the ground-penetrating sensor system may allow radar in vehicles to be used with driver assist systems (for example, backup, rear collision avoidance, lane change assist, and/or any other type of vehicle system) in some scenarios, and to also be used as a ground-penetrating radar in other scenarios. In this manner, ground-penetrating sensor systems may no longer require an operator to manually push a wheeled device or drag such a device behind the vehicle.

Figures 1A, 1B:
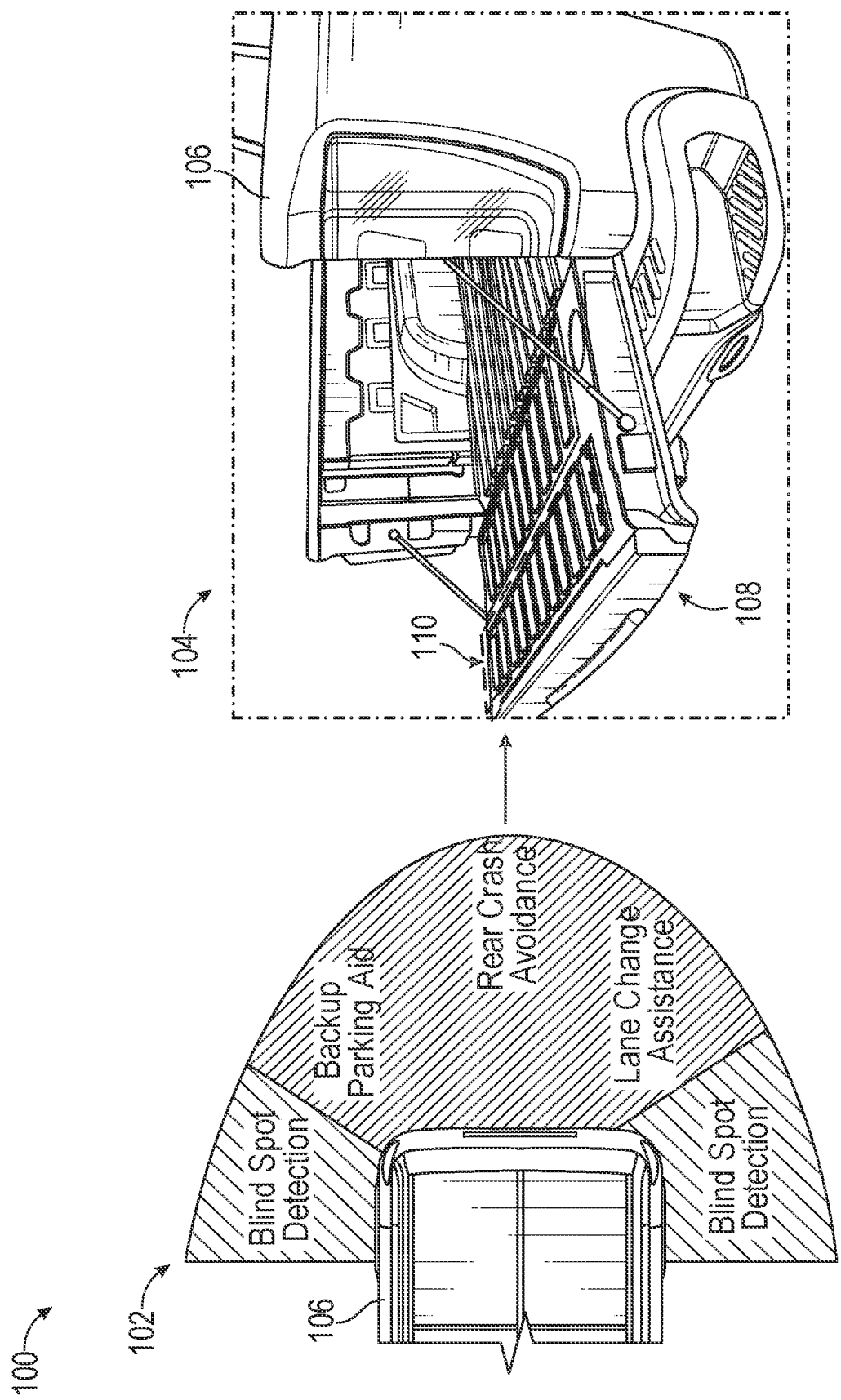
FIGS. 1A-1B illustrate an example ground-penetrating tailgate configuration, in accordance with one or more embodiments of the disclosure.

Turning to the figures, FIGS. 1A-1B illustrate an example ground-penetrating tailgate configuration 100, in accordance with one or more embodiments of the disclosure.

Particularly, the example ground-penetrating tailgate configuration 100 may illustrate a configuration in which one or more sensors (for example, radar, ultra-wideband sensors, and/or any other types of suitable sensors) may be positioned within the tailgate 108 of the vehicle 160 behind the trim applique (not shown in the figure) at a location 110 within the tailgate 108. The vehicle 106 may be configured such that the sensors may be used for ground-penetrating data collection purposes when the tailgate 108 is open (as illustrated in FIG. 1B) and the sensors are facing the ground, and the sensors may be used for other vehicles systems (for example, blind-spot detection, backup parking assistance, rear crash avoidance, lane change assistance, etc.) when the tailgate 108 is closed (e.g., up) and the sensors are facing the rear of the vehicle 106 (as illustrated in FIG. 1A). A power tailgate feature of the vehicle 106 may be used to automatically switch between these two modes. For example, a user may be able to switch the tailgate 108 between the closed position and the open position through the human-machine interface (HMI) of the vehicle 106, a mobile phone application, key fob, and/or through any other suitable system or method.

FIG. 2 illustrates an example ground-penetrating tailgate configuration 200, in accordance with one or more embodiments of the disclosure.

In one or more embodiments, the example ground-penetrating tailgate configuration 200 may involve the one or more sensors (not illustrated in the figure) being disposed of behind a trim applique 202 location on the tailgate 108 the vehicle 106 (for example, at the location 110). The sensors may be mounted near the top of the tailgate so the sensors are rearward of the bumper when the tailgate is deployed so the sensors may have an unobstructed view of the ground, and the bumper does not block the signals associated with the sensors.

In one or more embodiments, the trim applique 202 itself may be molded in color, painted, or have a chrome-like appearance. For trim appliques with a chrome-like appearance, a decorative film vacuum metalized with indium may be the preferred coating because it may provide the appearance of chrome, while simultaneously not interfering with sensor signals. Certain types of metallic paint may not be compatible with certain types of sensors. Given this, a compatible paint may need to be selected if the trim applique is painted.

FIG. 3 illustrates an example ground-penetrating tailgate configuration 300, in accordance with one or more embodiments of the disclosure.

In one or more embodiments, the example ground-penetrating tailgate configuration 300 may illustrate a configuration in which the sensors (not shown in the figure) may also be mounted on an extendable tailgate step 302. Similar to embodiments in which the sensors are disposed within the tailgate 108 itself, this embodiment may be configured such that the sensors may be used for ground-penetrating sensor purposes when the extendable step 302 is extended from the tailgate 108, and the sensors may be used for other vehicles systems when the extendable step 302 is stowed within the tailgate 108 (as illustrated in at least FIG. 4). This configuration extends the sensors further from the bumper, so the sensors may have an unobstructed view of the ground, and the bumper does not block the signals. Additionally, this configuration has the advantage of moving the sensors closer to the ground to potentially provide deeper or more detailed returns. Similar to other embodiments, the system can automatically switch between modes or as an option when the step is deployed, and the vehicle is powered and or motive.

FIG. 4 illustrates an example ground-penetrating tailgate configuration 400, in accordance with one or more embodiments of the disclosure.

In one or more embodiments, FIG. 4 illustrates another depiction of the ground-penetrating tailgate configuration 300 illustrates in FIG. 3 with the tailgate 108 in a closed position and the extendable tailgate step 302 being housed within the tailgate 108. That is, when the sensors included in the extendable tailgate step 302 are not being used for purposes of capturing data about objects located underground, the extendable tailgate step 302 may be retracted back into the tailgate 108 for storage purposes. When it is desired for data to be captured again, then the tailgate 108 may be transitioned into an open position and the extendable tailgate step 302 may be extended from the tailgate 108 to move the sensors closer to the ground. As aforementioned, this may provide more accurate data capture.

FIG. 5 illustrates an example ground-penetrating tailgate configuration 500, in accordance with one or more embodiments of the disclosure.

In one or more embodiments, FIG. 5 illustrates that the ground-penetrating tailgate sensor system may be used to capture data relating to locations other than underground locations as well. For example, in the use case illustrated in the figure, the ground-penetrating tailgate sensor system is shown as capturing data relating to an object 502 (e.g., a power line) that is located above the vehicle 106.

In one or more embodiments, the ability to capture data relating to overhead objects may provide an indication of objects that may provide low clearance for equipment or oversized loads, for example. This overhead data collection may be accomplished through a number of different tailgate sensor configurations. For example, in embodiments in which the sensors are disposed of in an extendable step, the sensors in the extendable step may face in an upwards direction when the tailgate 108 is closed. In some cases, the extendable step 302 may be retained within the tailgate 108 while the tailgate 108 overhead data capture is being performed. In some cases, the extendable step 302 may be extended from the tailgate while the overhead data capture is being performed. The extendable step 302 may be extended to move the sensors closer to the overhead object 502 for a number of reasons. For example, if the purpose of the overhead data capture is to merely capture data relating to objects that exist above the vehicle 106, then it may be beneficial to move the sensors closer to the objects for an increase in accuracy. If the purpose is to determine a distance between a top of the vehicle and an overhead structure (for example, a parking garage entrance), then the extendable step may be extended to be in line with the top of the vehicle 106 such that measurements may be taken from a height corresponding to the top of the vehicle. These are merely examples of how the extendable step 302 may be used to capture overhead data and types of use cases where this may be applicable and are not intended to be limiting.

In one or more embodiments, the overhead data collection may also be obtained using other ground-penetrating tailgate configuration, such as embodiments in which the sensors are disposed of in the tailgate behind the trim applique. In such embodiments, additional sensors may be disposed of in the applique that face in the upwards direction when the tailgate 108 is open. Alternatively, the sensors and/or the tailgate 108 may be physically rotatable so that the sensors may either point in the downward direction or in the upward direction.

In one or more embodiments, the direction from which data is obtained may automatically adjust based on the position of the tailgate 108 and the ground-penetrating tailgate configuration. For example, if the tailgate 108 is in a closed position (as shown in the figure), and data collection is being performed, then the ground-penetrating tailgate configuration may capture data overhead data. If the tailgate 108 is in an open position, and data collection is being performed, then the ground-penetrating tailgate configuration may capture underground data. However, the direction from which the data is obtained may also be manually indicated by a user as well. For example, a user may interact with the HMI of the vehicle 106 or a mobile device application to adjust the positioning of the tailgate 108 (and/or extendable step, if applicable), and/or to indicate which data capture direction is desirable.

Figure 6:
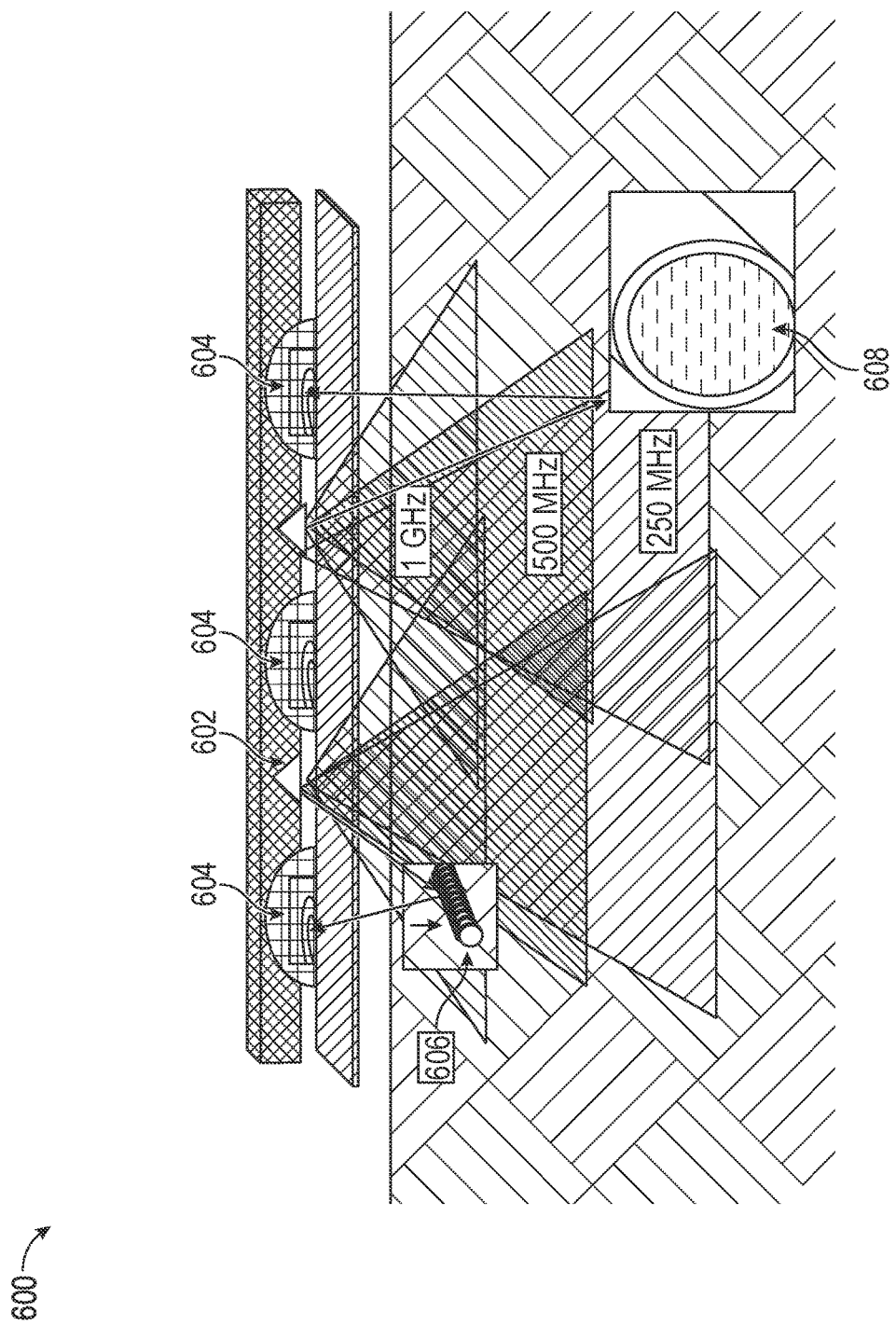
FIG. 6 illustrates an example radar configuration, in accordance with one or more embodiments of the disclosure.

FIG. 6 illustrates an example radar configuration 600, in accordance with one or more embodiments of the disclosure.

In one or more embodiments, example radar configuration 600 may illustrate an example configuration in which the ground-penetrating sensor system includes radar transceivers (for example, radar transmitters 602 and/or radar receivers 604). In the example radar configuration 600, multiple frequencies may be used for purposes of obtaining data. For example, a multi-frequency radar system rated at 15 W (or any other power level) may be used that sends radar signals at three distinct frequencies. The first frequency may be 250 MHz (or a similar frequency or range of frequencies). This frequency may be used for data collection from larger items that are located deeper underground, such as sewer lines. The 250 MHz radar may typically penetrate, depending on soil conditions, 15-30 feet deep, but may not be as accurate as higher frequency radar pulses. The second frequency may be 500 MHz (or a similar frequency or range of frequencies). This frequency may be more sensitive and may accurately map smaller objects, such as utility lines and larger electrical lines. The 500 MHz Radar may typically penetrate 8-15 feet, which may be ideal for utility lines and is more accurate than 250 MHz signals. The third frequency may be 1 GHz (or a similar frequency or range of frequencies). This frequency may be far more sensitive and may accurately map small items, such as conduits and dog fences. The 1 GHz radar may typically penetrate only 4-8 feet, so the lower frequencies may be required to capture data relating to items located deeper in the ground. Although this provides one example of a number of frequencies and/or specific frequency values, this is not intended to be limiting and any other number of frequencies and/or frequency values may also be used.

Figure 7:
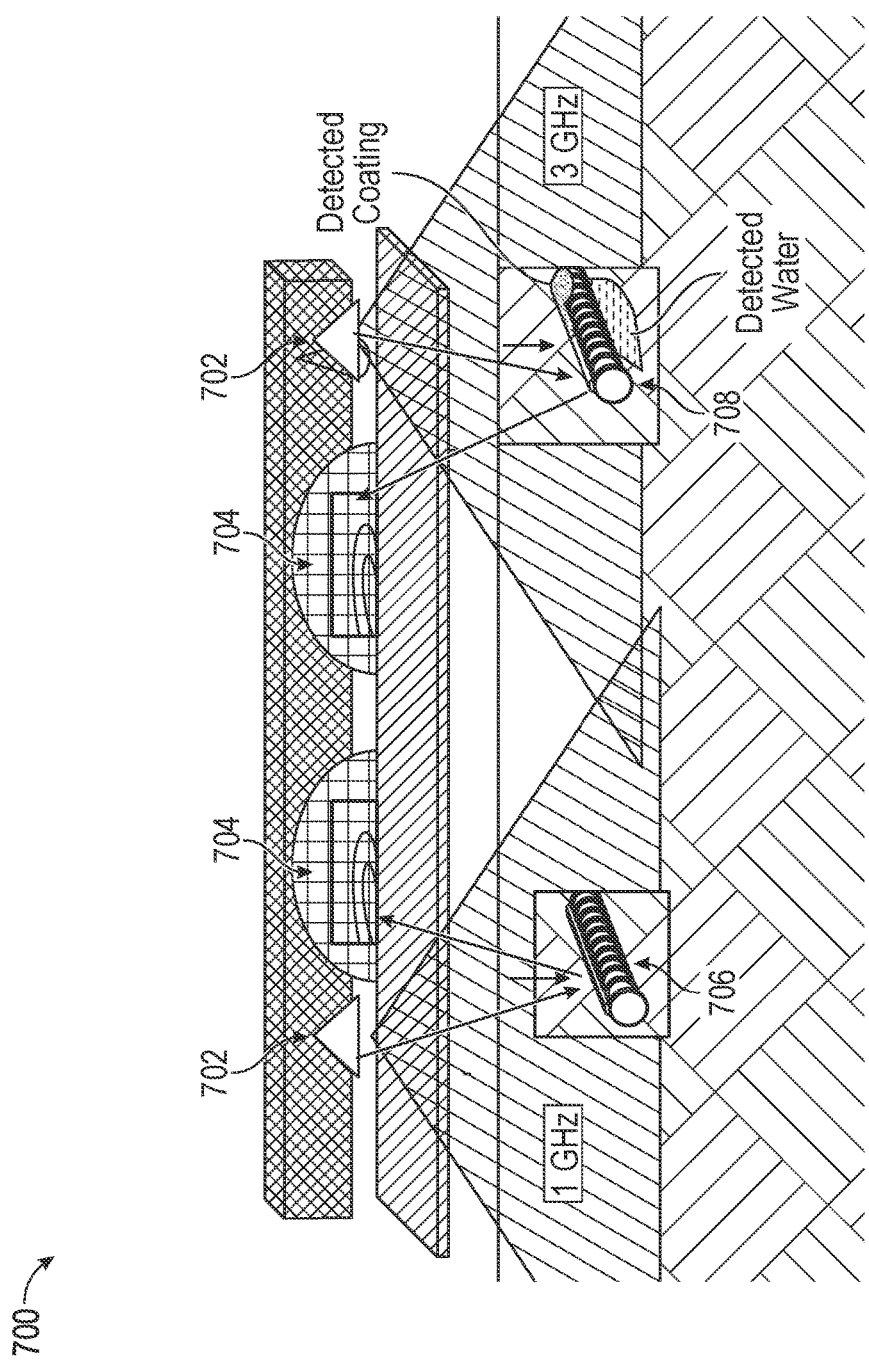
FIG. 7 illustrates an example ultra-wideband sensor configuration, in accordance with one or more embodiments of the disclosure.

FIG. 7 illustrates an example ultra-wideband sensor configuration 700, in accordance with one or more embodiments of the disclosure.

In one or more embodiments, example ultra-wideband sensor configuration 700 may illustrate an example configuration in which the ground-penetrating sensor system includes ultra-wideband sensors (for example, ultra-wideband transmitters 702 and/or ultra-wideband receivers 704). In one or more embodiments, if the sensors that are used in the ground-penetrating sensor system are ultra-wideband sensors, different frequencies may be used for purposes of obtaining data (however, the same frequencies may also be used as well). For example, a two-frequency radar system rated at 15 W (or any other power level) may be used that sends radar signals at three distinct frequencies. The first frequency may be 1 GHz (or a similar frequency or range of frequencies). This frequency may be far more sensitive and may accurately map small items, such as footings, conduits, buried utility and dog fences, etc. The 1 GHz UWB may typically penetrate only 4-8 feet. The second frequency may be 3 GHz (or a similar frequency or range of frequencies). This frequency may be far more sensitive and capable of detecting pockets of water, coatings, corrosion, density and/or swelling of small items such as rebar. The 3GHz UWB may typically penetrate only 4-8 feet, so radars may be used to gather data relating to deeper items. In walls, 1 GHz signals may be used to detect thinner objects like studs, wiring, plumbing, and nails within a wall. 3 GHz signals may be used to detect rebar coatings, voids and density differences like corrosion. Although this provides one example of a number of frequencies and/or specific frequency values, this is not intended to be limiting and any other number of frequencies and/or frequency values may also be used.

Figure 8:
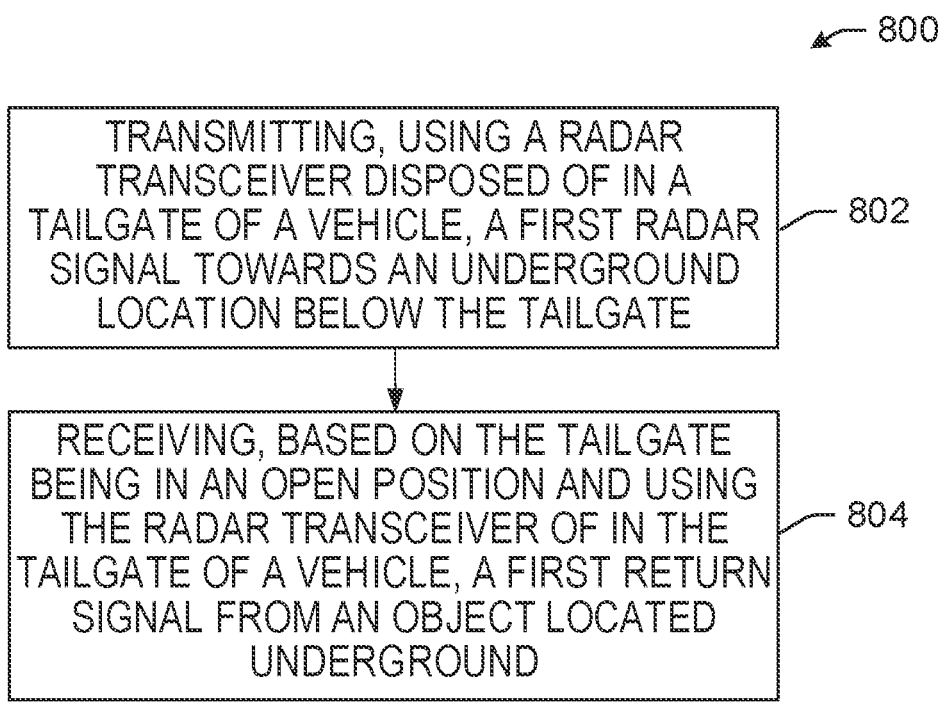
FIG. 8 illustrates an example method, in accordance with one or more embodiments of the disclosure.

FIG. 8 illustrates an example method 800, in accordance with one or more embodiments of this disclosure. At block 802, the method 800 may include transmitting, using a radar transceiver disposed of in a tailgate of a vehicle, a first radar signal towards an underground location below the tailgate. At block 804, the method 800 may also include receiving, based on the tailgate being in an open position and using the radar transceiver, a first return signal from an object located underground.

In one or more embodiments, separate radar transmitter(s) and receiver(s) may also be used.

In one or more embodiments, the radar transceiver receiver is disposed within a trim applique associated with the tailgate.

In one or more embodiments, the radar transceiver is disposed within a step that is configured to extend from the tailgate.

In one or more embodiments, the method 800 may also include transmitting, using the radar transceiver, a second radar signal towards a location above the tailgate. The method 800 may also include receiving, based on the tailgate being in a closed position and using the radar transceiver, a second return signal from an object located above the vehicle.

In one or more embodiments, the first radar signal is associated with a first frequency and the method 500 further includes transmitting a third radar signal at a second frequency and and/or a fourth radar signal at a third frequency.

In one or more embodiments, the radar transceiver is further configured to operate in association with additional vehicles functions based on the tailgate being in a closed position, wherein the additional vehicle functions include at least one of: blind-spot detection, back-up parking assistance, rear crash avoidance, and/or lane change assistance.

In one or more embodiments, the step is configured to extend from a top portion of the tailgate.

Figure 9:
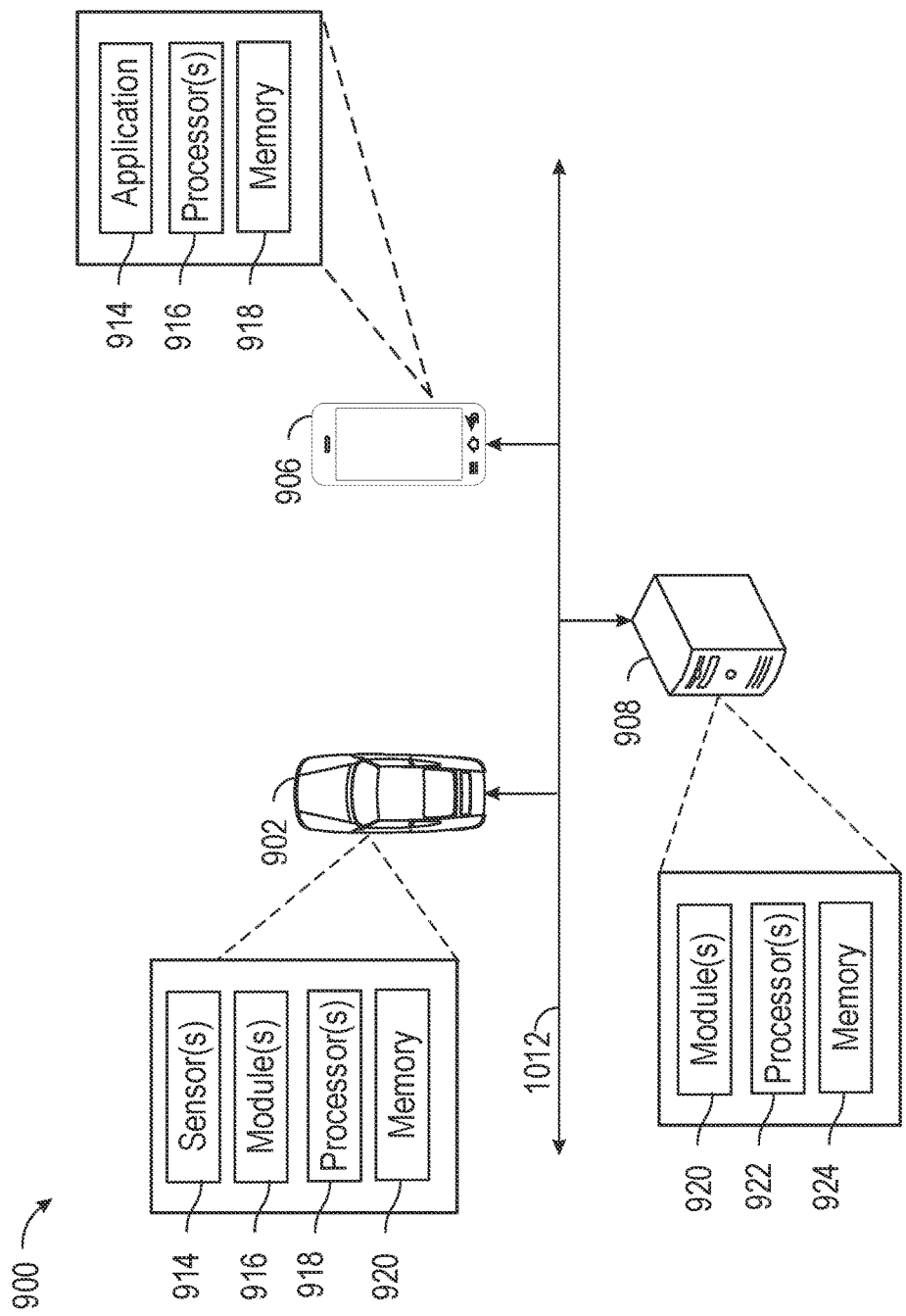
FIG. 9 illustrates an example of a system, in accordance with one or more embodiments of this disclosure.

FIG. 9 illustrates an example of a computing system 900, in accordance with one or more embodiments of this disclosure. In one or more embodiments, the system 900 may include at least one or more vehicles 902, one or more user devices 906, and/or one or more servers 908.

In one or more embodiments, a vehicle 902 may be a vehicle that may include any type of vehicle (for example, electric vehicle, hybrid vehicle, internal combustion engine vehicle, autonomous or semi-autonomous vehicle, etc.) a ground-penetrating tailgate sensor system as described herein. For example, the vehicle may include one or more sensors 914, such as radar, lidar, ultra-wideband, and/or any other types of sensors that may be capable of capturing data. These sensors 914 may be disposed within a tailgate of the vehicle. For example, as illustrated in at least FIG. 2, the sensors 914 may be disposed within a trim applique of the tailgate. The sensors 914 may also be disposed within an extendable step of the vehicle 902. The sensors 914 may also be disposed in any other location within the tailgate or the vehicle in general as well.

In one or more embodiments, the one or more user devices 906 may be devices that may be used by a user associated with a vehicle 902. A user device 906 may allow a user to perform any number of functions, such as indicating when data capture should be initiated, opening and/or closing the tailgate, extending the extendable step (in configurations in which such a step is used), and/or any other functions. Additionally, the vehicle 902 may include a human-machine interface (HMI) that may allow the user to perform the same or similar functions.

In one or more embodiments, the one or more servers 908 may be remote servers that may perform any of the analyses described herein. For example, the remote servers 908 may receive and/or analyze any data that is obtained by the vehicle 902 using the ground-penetrating tailgate sensor system, may provide an indication to the vehicle 902 that data should be obtained at a particular location, and/or any other functions as described herein or otherwise. As aforementioned, any of the operations described herein as being performed by the vehicle 902 may also be performed by the remote server 908.

Figure 10:
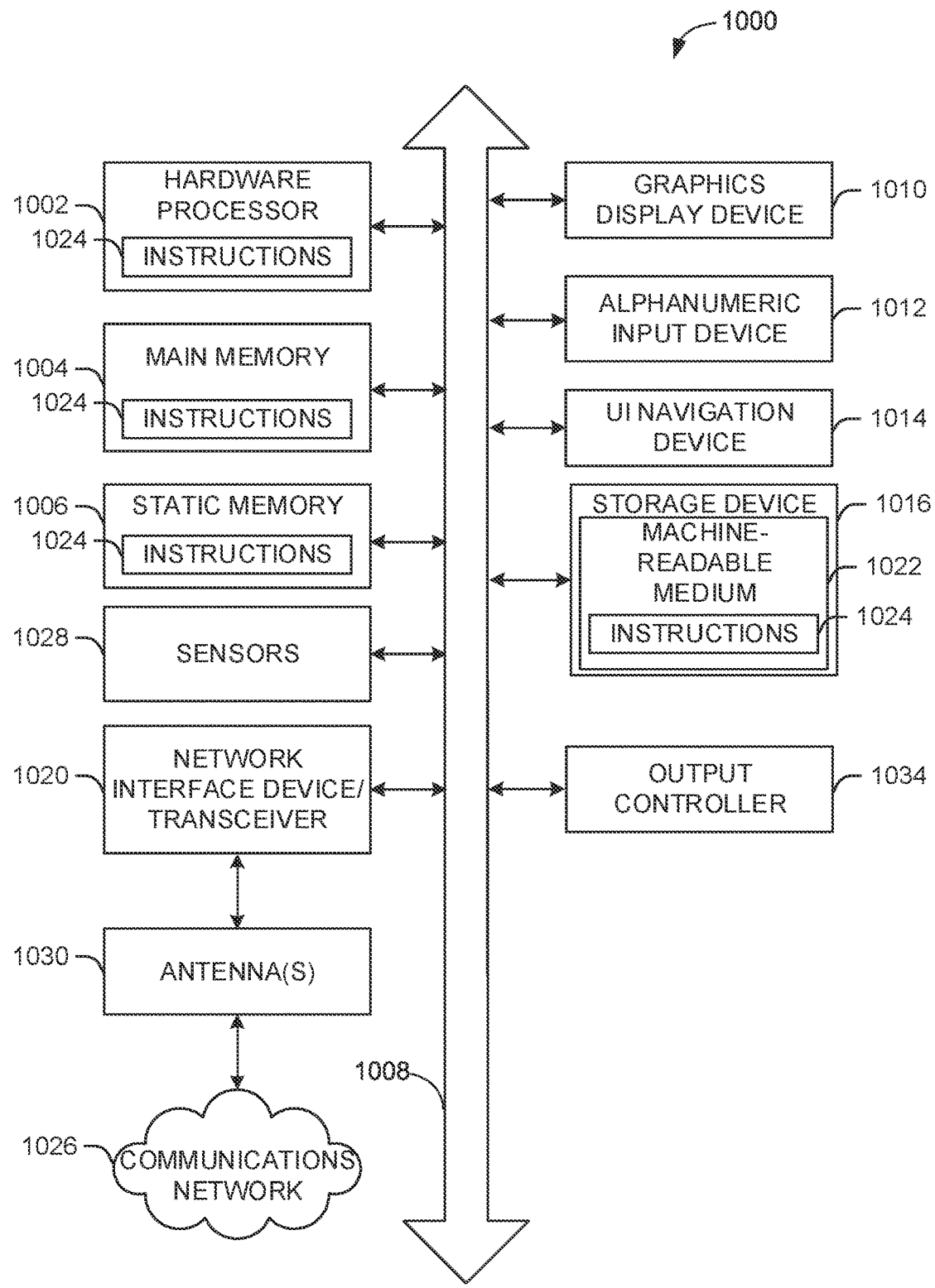
FIG. 10 illustrates an example of a computing system, in accordance with one or more embodiments of this disclosure.

In one or more embodiments, any of the one or more vehicles 902, one or more user devices 906, and/or one or more servers 908 and/or any other elements of the system 900 may include any of the components of the machine 1000 described with respect to FIG. 10. That is, as illustrated in the figure, these elements of the system 900 may include one or more processor(s) and memory, as well as at least any other elements described as being included in the machine 1000. That is, although the figure may only depict a particular element of system 900 as having one or more processors, memory, and one or more modules, this may not be intended to be limiting in any way.

FIG. 10 depicts a block diagram of an example machine 1000 upon which any of one or more techniques (e.g., methods) may be performed, in accordance with one or more example embodiments of the present disclosure. In other embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a personal computer (PC), a tablet PC, a set-top box (STB), a personal digital assistant (PDA), a mobile telephone, a smart key fob, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific task when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (i.e., drive unit) 1016, a network interface device/transceiver 1020 coupled to antenna(s) 1030, and one or more sensors 1028, such as a global positioning system (GPS) sensor, a compass, an accelerometer, or other sensor. The machine 1000 may include an output controller 1034, such as a serial (e.g., universal serial bus (USB)), parallel, or other wired or wireless (e.g., infrared (IR)), near field communication (NFC), etc. connection to communicate with or control one or more peripheral devices (e.g., a printer, a card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A vehicle comprising:
    a tailgate;
    a radar transceiver disposed within a step that is configured to extend below the tailgate and towards a ground when the tailgate is in an open position;
    a processor; and
    a memory storing computer-executable instructions, that when executed by the processor, cause the processor to:
    transmit, using the radar transceiver, a first radar signal towards an underground location below the tailgate;
    receive, based on the tailgate being in the open position and using the radar transceiver, a first return signal from an object located underground,
    cause the tailgate to be in a closed position that is orthogonal to the open position;
    extend the step from the tailgate in a vertical direction towards a top of the vehicle;
    transmit, using the radar transceiver, a second radar signal towards a location above the vehicle; and
    receive, based on the tailgate being in the closed position and using the radar transceiver, a second return signal from an object located above the vehicle.

2. The vehicle of claim 1, wherein the radar transceiver is disposed within a trim applique associated with the tailgate.

3. The vehicle of claim 1, wherein the first radar signal is associated with a first frequency, and wherein the computer-executable instructions further cause the processor to transmit a third radar signal at a second frequency and/or a fourth radar signal at a third frequency.

4. The vehicle of claim 1, wherein the radar transceiver is further configured to operate in association with additional vehicles functions based on the tailgate being in a closed position, wherein the additional vehicle functions include at least one of: blind-spot detection, back-up parking assistance, rear crash avoidance, and/or lane change assistance.

5. The vehicle of claim 1, wherein the computer-executable instructions further cause the processor to:
transmit, using the radar transceiver, a fifth third radar signal towards a location behind the tailgate; and
receive, based on the tailgate being in the closed position and using the radar transceiver, a third return signal from a second object.

6. The method of claim 1, wherein the step is configured to extend from a top portion of the tailgate.

7. The vehicle of claim 1, wherein the computer-executable instructions further cause the processor to cause the step to extend in the vertical direction to align with the top of the vehicle.

8. The vehicle of claim 1, wherein the computer-executable instructions further cause the processor to, prior to transmitting the first radar signal, receive information about a first direction from which data is to be obtained.

9. A method comprising:
transmitting, using a radar transceiver disposed of in a tailgate of a vehicle, a first radar signal towards an underground location below the tailgate, wherein the radar receiver is disposed within a step that is configured to extend from the tailgate;
receiving, based on the tailgate being in an open position and using the radar transceiver, a first return signal from an object located underground;
causing the tailgate to be in a closed position, wherein the closed position is orthogonal to the open position;
extending the step in a vertical direction towards a top of the vehicle in the closed position;
transmitting, using the radar transceiver, a second radar signal towards a location above the tailgate; and
receiving, based on the tailgate being in a closed position and using the radar transceiver, a second return signal from an object located above the vehicle.

10. The method of claim 9, wherein the radar transceiver is disposed within a trim applique associated with the tailgate.

11. The method of claim 9, wherein the first radar signal is associated with a first frequency, and wherein the method further comprises transmitting a third radar signal at a second frequency and/or a fourth radar signal at a third frequency.

12. The method of claim 9, wherein the radar transceiver is further configured to operate in association with additional vehicles functions based on the tailgate being in the closed position, wherein the additional vehicle functions include at least one of: blind-spot detection, back-up parking assistance, rear crash avoidance, and/or lane change assistance.

13. The method of claim 9, wherein extending the step further comprising aligning the step with the top of the vehicle.

14. The method of claim 9, wherein prior to transmitting the first radar signal, the method further comprising receiving information about a direction from which data is to be obtained.

15. A non-transitory computer-readable medium storing computer-executable instructions, that when executed by a processor, cause the processor to perform operations of:
placing a tailgate of a vehicle in a first position, wherein in the first position, the tailgate is substantially parallel to ground;
transmitting, using a radar transceiver disposed in a step that is integrated in the tailgate, a first radar signal towards an underground location below the tailgate;
receiving, based on the tailgate being in the first position and using the radar transceiver, a first return signal from an object located underground;
placing the tailgate in a second position, wherein the second position is orthogonal to the first position;
extending the step in a vertical direction towards a top of the vehicle;
transmitting, using the radar transceiver, a second radar signal in the vertical direction; and
receiving, by the radar transceiver, a second return signal from an object located above the vehicle.

16. The non-transitory computer-readable medium of claim 15, wherein the radar transceiver is disposed within a trim applique associated with the tailgate.

17. The non-transitory computer-readable medium of claim 15, wherein the first radar signal is associated with a first frequency, and wherein the computer-executable instructions further cause the processor to transmit a third radar signal at a second frequency and/or a fourth radar signal at a third frequency.

18. The non-transitory computer-readable medium of claim 15, wherein the radar transceiver is further configured to operate in association with additional vehicle functions based on the tailgate being in a closed position, wherein the additional vehicle functions include at least one of: blind-spot detection, back-up parking assistance, rear crash avoidance, and/or lane change assistance.

19. The non-transitory computer-readable medium of claim 15, wherein the computer-executable instructions further cause the processor to perform an operation of aligning the step with the top of the vehicle.

20. The non-transitory computer-readable medium of claim 15, wherein the computer-executable instructions further cause the processor to perform operation of, prior to transmitting the first radar signal, receiving information about a direction from which data is to be obtained.

* * * * *